United States Patent

Capman et al.

Patent Number: 6,108,413
Date of Patent: Aug. 22, 2000

[54] ECHO CANCELLATION METHOD AND ECHO CANCELLER IMPLEMENTING SUCH A PROCESS

[75] Inventors: François Capman, Versailles; Jérôme Boudy, Fontenay le Fleury, both of France

[73] Assignee: Matra Communication, France

[21] Appl. No.: 09/007,836

[22] Filed: Jan. 15, 1998

[30] Foreign Application Priority Data

Jan. 21, 1997 [FR] France .................. 97 00575

[51] Int. Cl.⁷ ............................. H04B 3/23
[52] U.S. Cl. .................. 379/410; 379/390; 379/406; 379/409; 370/289
[58] Field of Search .............. 379/410, 390, 379/406, 409, 411; 370/289, 288, 290; 381/66

[56] References Cited

U.S. PATENT DOCUMENTS

| | | | |
|---|---|---|---|
| 4,956,838 | 9/1990 | Gilloire et al. | |
| 5,163,044 | 11/1992 | Golden | 370/286 |
| 5,305,307 | 4/1994 | Chu | 370/288 |
| 5,418,849 | 5/1995 | Cannalire et al. | 379/410 |
| 5,721,782 | 2/1998 | Piket et al. | 381/66 |
| 5,856,970 | 1/1999 | Gee et al. | 370/286 |
| 5,898,928 | 4/1999 | Karlsson et al. | 455/450 |
| 5,933,797 | 8/1999 | Hakansson et al. | 702/191 |

FOREIGN PATENT DOCUMENTS

| | | |
|---|---|---|
| 0 667 700 | 8/1995 | European Pat. Off. |
| WO96/21313 | 7/1996 | WIPO |
| WO96/23384 | 8/1996 | WIPO |

OTHER PUBLICATIONS

J.J. Shynk, "Frequency–Domain and Multirate Adaptive Filtering", IEEE SP Magazine, pp. 15–37, Jan. 1992.

J. Boudy et al., "A Globally Optimised Frequency–Domain Acoustic Echo Canceller for Adverse Environment Applications", IEEE Proc. Internaltional Workshop on Acoustic Echo and Noise Control, Røros, Norway, pp. 95–98, Jun. 1995.

O.Ait Amrane et al., "Low–Delay Frequency Domain LMS Algorithm", IEEE Proc. ICASSP' 92, vol. 4, pp. 9–12, Mar. 23–26, 1992.

T. Gänsler et al. "A Double–Talk Detector Based on Coherence", IEEE Transactions On Communications, vol. 44, No. 11, pp. 1421–1427, Nov. 1996.

F. Capman et al "Acoustic Echo Cancellation using a Fast QR–RLS Algorithm and Multirate Schemes", IEEE ICASSP'95, Detroit, 1995.

(List continued on next page.)

*Primary Examiner*—Vivian Chang
*Assistant Examiner*—Daniel Abebe
*Attorney, Agent, or Firm*—Kilpatrick Stockton LLP

[57] ABSTRACT

A reception signal is input to an echo generator system. An observation signal is gathered from the system. The reception signal is filtered to produce an echo prediction signal. The echo prediction signal is subtracted from the observation signal to produce an error signal. The observation signal is decomposed into M spectral components relating to different frequencies of the spectrum. M corresponding spectral components of the echo prediction signal are obtained. M quantities, each having a value with progressive variation representative of a degree of similitude between, respectively, one of the M spectral components of the observation signal and the corresponding spectral component of the echo prediction signal, are calculated. At least one spectral shaping of the error signal is carried out as a function of these M calculated quantities so as to adapt the filtering and/or to deliver the output signal from the echo canceller.

22 Claims, 8 Drawing Sheets

OTHER PUBLICATIONS

T. Gänsler et al., "A Double Talk Detector Based on Coherence", Proc. of the International Conference on Signal Processing Applications & Technology, Boston, MA, USA, Oct. 24–26, 1995, pp. 332–336.

T.W. Wong et al., "Adaptive Filtering Using Hartley Transform and Overlap–Save Method", IEEE Transactions on Signal Processing, vol. 39, No. 7, pp. 1708–1711, Jul. 1991.

H.S. Malvar, "Extended Lapped Transforms: Properties, Applications, and Fast Algorithms", IEEE Transactions on Signal Processing, vol. 40, No. 11, pp. 2703–2714, Nov. 1992.

J.S. Soo et al., "A Multistep Size (MSS) Frequency Domain Adaptive Filter", IEEE Transactions on Signal Processing, vol. 39, No. 1, pp. 115–121, Jan. 1991.

J.S. Soo et al., "Multidelay Block Frequency Domain Adaptive Filter", IEEE Transactions on Acoustics, Speech, and Signal Processing, vol. 38, No. 2, pp. 373–376, Feb. 1990.

ECHO CANCELLATION METHOD AND ECHO CANCELLER IMPLEMENTING SUCH A PROCESS

BACKGROUND OF THE INVENTION

The present invention relates to the field of echo cancellation. It relates in particular, but not exclusively, to acoustic echo cancellers for hands-free telephone installations.

An echo canceller, a basic diagram of which is shown in FIG. 1, processes on the one hand a reception signal x(n) originating from a distant device and applied to an input of a local system 1, and on the other hand an observation signal z(n) emanating from the system 1, so as to produce another signal e(n) which is returned to the distant device by way of a communication channel. It is assumed that the signals x(n) and z(n) are digital signals, sampled for example at 8 kHz for speech in the telephone band, or at 16 kHz in broadband.

The echo canceller represented in FIG. 1 is intended for a hands-free telephone installation. The local system 1 thus comprises a digital/analogue converter 2 to which the reception signal x(n) is applied, a loudspeaker 3 receiving the amplified analogue output from the converter 2, a microphone 4 which picks up the local speech P and also ambient noise B and echo components EC of the reception signal which are due to the acoustic couplings between the loudspeaker 3 and the microphone 4, and an analogue/digital converter 6 which produces the observation signal z(n) by digitizing the amplified output from the microphone 4.

The echo canceller comprises a digital filter 7 which delivers an echo prediction signal y(n) from the reception signal x(n). This filter, which has finite impulse response (FIR) in the case considered with reference to FIG. 1, models the response of the echo paths within the system 1. The error signal e(n) is delivered by a subtracter 8 which deducts the echo prediction signal y(n) from the observation signal z(n).

So as to include the variability of the echo paths, the echo canceller is often adaptive, that is to say the coefficients of the filter 7 are adjusted dynamically by an adaptation control module 9 implementing an appropriate adaptation algorithm. In general, the adaptation of the coefficients is performed as a function of the input signal x(n) and of the error signal e(n). Numerous possible adaptation algorithms are known, especially diverse versions of the gradient algorithm.

Frequently, the adaptive echo canceller is associated with a voice activity detector and with a double-talk detector, which are not represented in FIG. 1. These detectors are used to disable the adaptation of the coefficients of the filter 7 when the reception signal x(n) does not include any voice activity, and when decorrelated voice activities are present in the signals x(n) and z(n). Thus, in these two particular cases, the signal z(n) does not represent a good observation of the echo paths which can be exploited by the adaptation control module 9. It is known that the double-talk detector is the source of numerous difficulties for the designer of an echo canceller. In particular, these detectors are frequently disturbed when the ambient noise B is relatively sizable. Furthermore, it is often tricky to discriminate between double-talk situations, and on/off adaptation control based on such discrimination, impairs good convergence of the algorithm.

There are various possible ways of carrying out the filtering of the reception signal x(n), which are in their turn compatible with various types of adaptation algorithms. In the conventional case of FIG. 1, an FIR filter 7 is used which carries out the convolution between the reception signal and the estimated impulse response, N samples in length, of the echo paths.

In the embodiment represented in FIG. 2, the filtering is carried out in the frequency domain. This implementation is well suited to the long impulse responses of the echo paths and to the high degree of correlation exhibited by the speech signals. The convolutions are replaced by term-by-term products between the Fourier transforms of the reception signal and of the impulse response, and calculated according to a fast convolution technique OLS (Overlap-and-Save) or OLA (Overlap-Add) (see J. J. Shynk: "Frequency-Domain and Multirate Adaptive Filtering", IEEE SP Magazine, January 1992, pages 15–37). To calculate convolutions using an FIR filter with N coefficients, the OLS or OLA technique works on successive blocks of 2N samples of the signals, which exhibit overlaps of size N.

The adaptation control means can be devised so as to calculate the gradient according to an unconstrained algorithm, such as that described by D. Mansour et al. in "Unconstrained frequency-domain adaptive filter", IEEE Trans. on Acoustics, Speech and Signal Processing, Vol. 30, No. 5, October 1982, pages 726–734. Such is the case in the example represented in FIG. 2. A constrained gradient algorithm may also be employed (see for example E. R. Ferrara: "Fast implementation of LMS adaptive filters", IEEE Trans. on Acoustics, Speech and Signal Processing, Vol. 28, No. 4, August 1980, pages 474–475), the adaptation control means then including projection means for taking account of the fact that the 2N filtering coefficients in fact represent only N terms of the impulse response.

In order to reduce the delay inherent in block processing and to improve performance, the filtering in the frequency domain can be performed with a partitioning of the impulse response (see J. S. Soo et al.: "Multidelay Block Frequency Domain Adaptive Filter", IEEE Trans. on Acoustics, Speech and Signal Processing, Vol. 38, No. 2, February 1990, pages 373–376). Another possibility is to employ an overlap technique such as that described by O. Ait Amrane et al.: "Low-Delay Frequency Domain LMS Algorithm", IEEE Proc. ICASSP'92, Vol. 4, March 1992, pages 9–12.

On the other hand, echo cancellers in the frequency domain have the advantage of lending themselves well to processing operations for reducing noise in the error signal (cf. J. Boudy et al.: "A globally optimized frequency-domain acoustic echo canceller for adverse environment applications", Proc. of the International Workshop on Acoustic Echo and Noise Control, Roros, Norway, June 1995, pages 95–98; or international patent application WO96/23384).

In the echo canceller of FIG. 2, serial/parallel converters 11, 12 respectively receive the signals x(n) and z(n), and cast them into the form of non-overlapping successive segments of S samples, S being an integer less than or equal to the length N of the impulse response. The echo prediction signal y(n) is also produced in the form of corresponding segments of S samples. The subtracter 8 then carries out the operation e(n)=z(n)−y(n) in parallel so as to produce the error signal in the form of segments of S samples which are next cast back into sequential form by a parallel/serial converter 13.

Owing to the convolution technique employed, which is an OLS technique in the case represented, the Fourier transforms of the signals x(n) and e(n) are carried out on blocks of length 2N samples, by units 16, 17 implementing a conventional fast Fourier transformation (FFT) algorithm. The successive blocks of the reception signal x(n) are constructed by a unit 18 so as to exhibit overlaps of 2N-S samples. These blocks are numbered by an index k. On receiving a segment of S samples of the signal x(n), the unit 18 builds block k by deleting the oldest S samples of block k-1, while shifting the remaining 2N-S samples and introducing the S new samples. The successive blocks of the error signal e(n) are constructed by a unit 19 from the segments delivered by the subtracter 8 so that each block of length 2N begins with N zero samples and the last N samples of two successive blocks exhibit overlaps of N-S samples. The Fourier components obtained by transforming the blocks k of the reception signal x(n) and the error signal e(n) are denoted $X_k(f)$ and $E_k(f)$ respectively ($1 \leq f \leq 2N$). For a sampling frequency of 8 kHz, typical sizes of segments and blocks for filtering in the frequency domain are S=32, 2N=256.

The Fourier components produced by the units 16, 17 are supplied to the adaptation control means 9 which, in the example illustrated by FIG. 2, consist of 2N independent modules 9.f ($1 \leq f \leq 2N$) each receiving the corresponding components $X_k(f)$ and $E_k(f)$ and respectively producing the 2N complex coefficients serving in the filtering in the frequency domain. The filter 7 is composed of 2N complex multipliers 7.f each receiving a Fourier component $X_k(f)$ and the corresponding coefficient delivered by the adaptation control module 9.f, and delivering a Fourier component $Y_k(f)$. In practice, given the symmetry properties of the Fourier transform, it is possible to obtain the 2N components $Y_k(f)$ by means of N+1 multipliers only. A unit 21 effects an inverse fast Fourier transform (IFFT) of the block of 2N components $Y_k(f)$. A unit 22 constructs the echo prediction signal y(n) segment by segment on the basis of the blocks of 2N samples delivered by the unit 21. The unit 22 extracts the last N samples of each block received from the unit 21 and, when S<N, also carries out the overlap-adds necessary for reconstituting the successive segments of the filtered signal y(n).

As is well known, the fast Fourier transforms can be replaced by fast Hartley transforms which lead to spectral components which are directly related to the Fourier components (see T. W. Wong et al.: "Adaptive Filtering Using Hartley Transform and Overlap-Save Method", IEEE Trans. on Signal Processing, Vol. 39, No. 7, July 1991, pages 1708–1711).

FIG. 3 shows another possible embodiment of an adaptive echo canceller which employs sub-band decomposition. We consider by way of example the case in which four sub-bands are envisaged. We denote by $x_{(i)}(n')$, $y_{(i)}(n')$, $z_{(i)}(n')$ and $e_{(i)}(n')$ the components relating to sub-band i ($1 \leq i \leq 4$) of the signals x(n), y(n), z(n) and e(n).

The signals $x_{(i)}(n')$ and $z_{(i)}(n')$ are obtained by decomposing the signals x(n) and z(n) by means of two decomposition stages, the first stage comprising a module D, D' with one input and two outputs of the type represented in FIG. 4, and the second stage comprising two modules D, D' of the same type, whose inputs are respectively linked to the two outputs of the module of the first stage. Each module D or D' comprises a low-pass filter 23 and a high-pass filter 24 both receiving the input signal from the module and two circuits 26 which sub-sample the output signals from the filters 23, 24 by a factor 2, so as to produce the two output signals from the module D, D'.

The sub-band echo canceller includes an adaptive filter 7 for each sub-band, which filters in the time domain the corresponding component $x_{(i)}(n')$ of the reception signal so as to produce the component $y_{(i)}(n')$ of the echo prediction signal which is subtracted by a subtracter 8 from the component $z_{(i)}(n')$ of the observation signal. For each sub-band, a module 9 controls the adaptation of the filter 7.

Means for recombining in two stages construct the error signal e(n) from the four components $e_{(i)}(n')$ delivered by the subtracters 8. The first stage comprises two modules R with two inputs and one output of the type represented in FIG. 5, and the second stage comprises a single module R of the same type, the two inputs of which are linked to the outputs of the two modules of the first stage. Each module R comprises two circuits 27 for oversampling the two input signals from the module by a factor 2, a low-pass filter 28 and a high-pass filter 29 respectively receiving the two oversampled signals produced by the circuits 27, and a summator 31 which adds together the output signals from the two filters 28, 29 so as to produce the output signal from the module R.

Various conventional forms for the decomposition and recombination filters 23, 24, 28, 29 are known and these may generally have finite or infinite impulse response, for example conjugate quadrature filters (CQF), quadrature mirror filters (QMF), or else wavelet decomposition filters (WDF). Moreover, a direct-decomposition structure of the cosine-modulated filter bank type may be used instead of the multistage structure (see H. S. Malvar: "Extended Lapped Transforms: Properties, Applications, and Fast Algorithms", IEEE Trans. on Signal Processing, Vol. 40, No. 11, November 1992, pages 2703–2714, or P. P. Vaidyanathan: "Multirate Digital Filters, Filter Banks, Polyphase Networks and Applications: A Tutorial", Proc. of the IEEE, Vol. 78, No. 1, January 1990, pages 56–93).

The adaptation algorithms implemented by the modules 9 of the sub-band echo canceller may be of the same type as those commonly used to adapt the full-band time filtering. There are however algorithms which are especially well suited to the sub-band structure, such as the fast recursive least square algorithm (RLS) with QR decomposition (cf. F. Capman et al.: "Acoustic echo cancellation using a fast-QR-RLS algorithm and multirate schemes", IEEE ICASSP'95, Detroit, 1995; or international patent application WO96/21313). It is also possible to use convergence parameters and/or adaptation algorithms which differ from one sub-band to another. In particular, in the sub-bands relating to the lowest frequencies it is possible to use an algorithm (such as the fast QR-RLS) which is more efficient than in the higher sub-bands, wherein an algorithm which is less demanding in terms of computational resources may be used (such as an NLMS).

In certain echo cancellers, the coefficients of the echo prediction filtering are frozen during operation. These coefficients can be fixed; they are then determined once and for all so as to take into account, for example, the responses of the loudspeaker 3 and of the microphone 4, direct couplings between the loudspeaker and the microphone, and possibly indirect couplings if the loudspeaker and the microphone always remain in the same positions. The coefficients can also be determined by learning, either when switching on the echo canceller or periodically, by bringing about convergence of an adaptation algorithm on a signal superimposed on or substituted for the reception signal and having decorrelation properties similar to those of white noise.

Echo cancellers are also known in which there are several echo prediction filters, the signal transmitted towards the communication channel being obtained by selecting one of the filters according to predefined criteria such as minimization of the energy of the error signal, or else by combining the outputs from several echo prediction filters (see W. Armbruster: "Wideband Acoustic Echo Canceller with Two Filter Structure", Signal Processing VI : Theories and Applications, 1992, pages 1611–1614, or J. S. Soo et al.: "A Multistep Size (MSS) Frequency Domain Adaptive Filter", IEEE Trans. on Signal Processing, Vol. 39, No. 1, January 1991, pages 115–121). The echo canceller can for example include one or more adaptive filters operating with different convergence parameters or according to different adaptation algorithms, and/or one or more filters with fixed coefficients, and/or one or more filters whose coefficients are determined by learning.

A primary object of the present invention is to improve the convergence and/or the quality of the output signal from an echo canceller, especially from an echo canceller which involves a spectral resolution (filtering in the frequency domain or by sub-bands).

SUMMARY OF THE INVENTION

The invention thus proposes an echo cancellation method, wherein a reception signal is input to an echo generator system, an observation signal is gathered from said system, the reception signal is filtered so as to produce at least one echo prediction signal for predicting an echo of the reception signal in the observation signal, and an echo prediction signal is subtracted from the observation signal so as to produce an error signal. According to the invention the observation signal is decomposed into M spectral components relating to different frequencies of the spectrum, M denoting an integer greater than 1, M corresponding spectral components of an echo prediction signal are obtained, M quantities are calculated from the spectral components of the observation signal and of the echo prediction signal, each of said M quantities having a value with progressive variation representative of a degree of similitude between, respectively, one of the M spectral components of the observation signal and the corresponding spectral component of the echo prediction signal, and at least one spectral shaping of the error signal is carried out as a function of said M calculated quantities.

The M quantities afford information relating to the presence of interferences (ambient noise or local speech) in the observation signal, this information being frequency-selective and having progressive variation, thus ensuring a richness of information and an accuracy which are substantially greater than the conventional double-talk detectors which are essentially binary decision type over the whole spectral band.

When the filtering of the reception signal is adapted as a function of the reception signal and of the error signal, the spectral shaping of the error signal can serve to produce a filtered error signal used for the adaptation of the filtering of the reception signal. The shaping then consists in attenuating, preferably in a non-linear manner, the spectral components of the error signal for which the quantity calculated manifests a relatively weak similitude between the corresponding spectral components of the observation signal and of the echo prediction signal.

The spectral shaping of the error signal can also serve to produce a post-filtered error signal which the echo canceller transmits towards the communication channel. In this case, the post-filtering tends rather to attenuate, preferably in a non-linear manner, the components of the error signal for which the quantity calculated shows a relatively large similitude between the corresponding components of the signals y(n) and z(n).

Contrary to the customary practice in the field of double-talk detectors, the spectral components of the echo prediction signal rather than those of the reception signal are compared with the corresponding components of the observation signal so as to quantify the degree of similitude between these components. Thus, the temporal aspects of the echo paths are already taken into account by the filtering carried out on the reception signal.

It is noted that if the echo canceller is provided with several echo prediction filters, it is conceivable for the echo prediction signal, on the basis of which the M quantities representing the degrees of similitude are calculated, not to be the same as that which is subtracted from the observation signal to produce the error signal subjected to the spectral shaping (filtering and/or post-filtering) . Provision may in particular be made for a filter with fixed coefficients to be employed specially to produce the echo prediction signal serving in the calculation of the M similitude quantities.

When the M spectral components of the observation signal and of the echo prediction signal are Fourier components of these signals, it is advantageous for the quantity representative of the degree of similitude between two corresponding Fourier components of the observation signal and of the echo prediction signal to be a value of a function of coherence between these Fourier components. This arrangement will advantageously be adopted in an echo canceller with filtering in the frequency domain, since calculations of Fourier or Hartley transforms are in any event necessary in this case. These arrangements are also applicable in the case of filtering in the time domain.

The use of the coherence function has already been proposed in double-talk detectors (cf. T. Gansler et al.: "A double-talk detector based on coherence", Proc. of the International Conference on Signal Processing Applications and Technology, Boston, October 1995, pages 332–336). Apart from the different application context, it may be noted that these authors calculate the coherence between the observation signal and the reception signal, and hence do not correct the acoustic channel, and that the decisions taken in conjunction with the calculated coherences are of a binary nature.

Alternatively, it is possible to replace the coherence function by a decreasing function of the absolute value of the angle formed, in the complex plane, between the corresponding Fourier components of the observation signal and of the echo prediction signal. This decreasing function may in particular be the cosine, or the cosine squared, of the angle bounded by $\pm\pi/2$. It may be shown that this cosine is directly related to the coherence function. The advantage of this formulation is that the cosine, or its square, can be calculated simply without requiring a memory necessary for calculating the averages which are used to obtain the values of the coherence function. The measurement therefore more rapidly reflects the variations in the signals.

In the case of a sub-band echo canceller, the M spectral components of the observation signal are obtained via a decomposition into M sub-bands of the observation signal, the same sub-band decomposition is performed on the reception signal so as to produce M corresponding spectral components of the reception signal, the echo prediction signal is produced in the form of its M spectral components respectively delivered by the M adaptive filters to which the M spectral components of the reception signal are respectively applied, and the error signal is produced in the form of M corresponding spectral components each of which is obtained by subtracting a spectral component of the echo prediction signal from a corresponding spectral component of the observation signal. In this case, the quantity representative of the degree of similitude between two corresponding spectral components of the observation signal and of the echo prediction signal is advantageously a value of a function of normalized intercorrelation between these spectral components.

DESCRIPTION OF PREFERRED EMBODIMENTS

Figure 1:
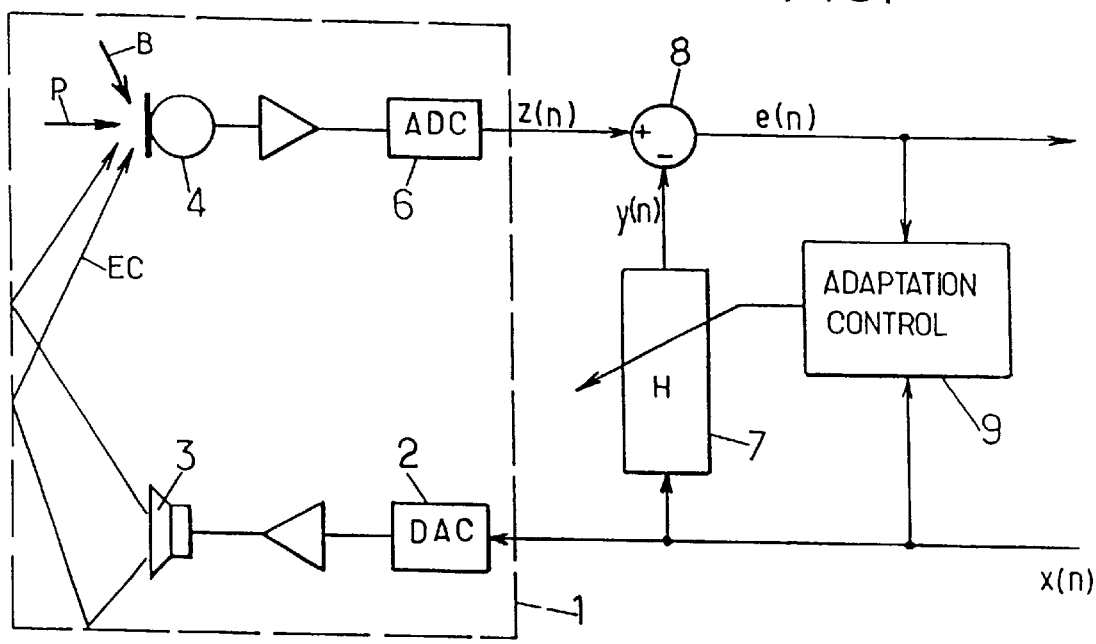
FIG. 1, previously commented upon, is a basic diagram of an adaptive echo canceller with full-band filtering in the time domain.
Figure 6:
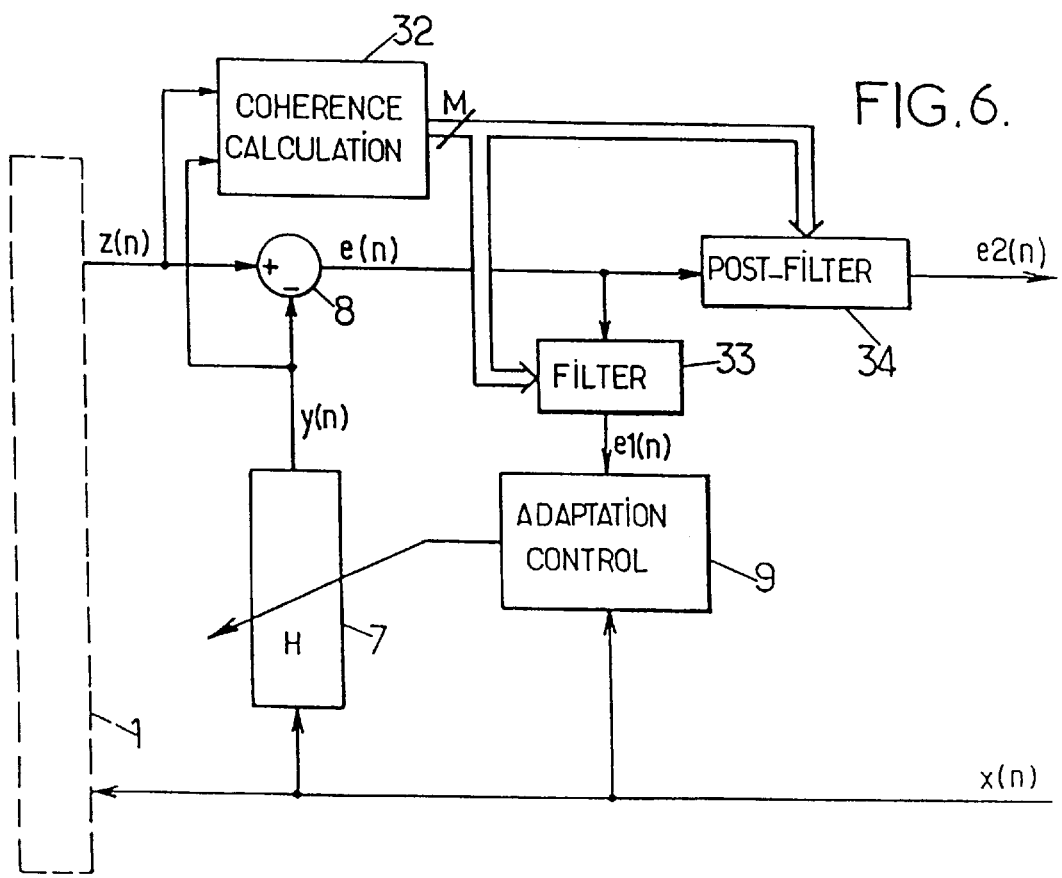
FIG. 6 is a basic diagram of an adaptive echo canceller according to the present invention.

FIG. 6 enlists the basic diagram of the echo canceller of FIG. 1, appending thereto three modules 32, 33, 34 serving in the implementation of the present invention. The module 32 calculates M quantities which, with a certain spectral resolution, characterize a degree of similitude between the observation signal z(n) and the echo prediction signal y(n). The module 33 is a filter which, on the basis of these M quantities, carries out a spectral shaping of the error signal e(n), and supplies the signal thus shaped e1(n) to the adaptation control module 9. The module 34 is a post-filter which carries out another spectral shaping of the error signal e(n) on the basis of the M quantities so as to transmit the signal thus post-filtered e2(n) towards the communication channel to which the echo canceller is linked.

Although the diagram of FIG. 6 has been established in the case in which, according to FIG. 1, the echo cancellation relies on full-band filtering in the time domain, it will be understood that the appending of three modules such as 32, 33, 34, makes it possible in general to implement the invention in any type of echo canceller.

In the case of FIG. 6, the M quantities calculated by the module 32 are values of a coherence function between Fourier components of the observation signal z(n) and corresponding Fourier components of the echo prediction signal y(n). The module 32 can then have the construction represented in FIG. 7.

Figure 7:
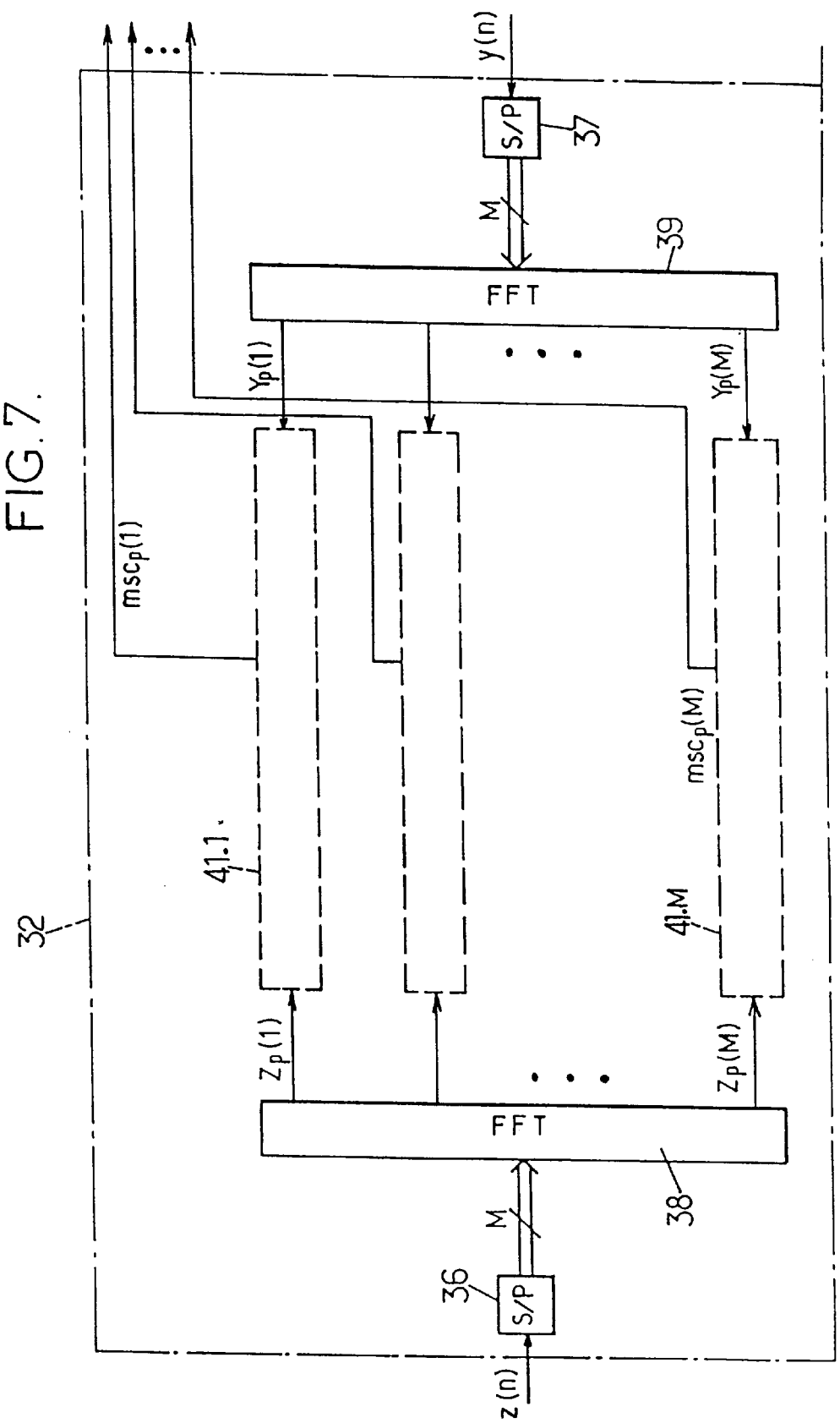
FIG. 7 is a schematic diagram of a coherence computing unit of the echo canceller of FIG. 6.

In the module 32 of FIG. 7, serial/parallel converters 36, 37 respectively receive the signals z(n) and y(n), and cast them into the form of successive blocks of M samples. These blocks may generally be overlapping or non-overlapping. The Fourier transforms of the signals y(n) and z(n) are carried out on these blocks of length M samples by units 38, 39 implementing a conventional FFT algorithm. We denote by $Z_p(m)$ and $Y_p(m)$ the mth Fourier components delivered by the units 38 and 39 in relation to the block of rank p of the observation signal z(n) and of the echo prediction signal y(n) ($1 \leq m \leq M$).

For each frequency index m, the Fourier components $Z_p(m)$ and $Y_p(m)$ are supplied to an associated unit 41.m which calculates the corresponding value of the coherence function $msc_p(m)$. These units 41.m all have the same construction. In the example considered, the coherence function employed is the squared modulus of the coherence ("magnitude squared-coherence"), which is expressed as:

$$msc_p(m) = \frac{|\gamma_p^{YZ}(m)|^2}{\gamma_p^{YY}(m) \cdot \gamma_p^{ZZ}(m)} \quad (1)$$

where $Y_p^{YY}(m)$ and $Y_p^{ZZ}(m)$ denote the spectral power densities, estimated at the moment of block p for the mth frequency, of the signals y(n) and z(n), and $Y_p^{YY}(m)$ denotes the cross spectral density of these two signals, estimated at the moment of block p for the mth frequency. These spectral power densities can be calculated simply by the module 41.m with the aid of an forgetting factor $\lambda$ such that $0 << \lambda < 1$, as follows:

$$\gamma_p^{YY}(m) = \lambda \cdot \gamma_{p-1}^{YY}(m) + (1-\lambda) \cdot |Y_p(m)|^2 \quad (2)$$

$$\gamma_p^{ZZ}(m) = \lambda \cdot \gamma_{p-1}^{ZZ}(m) + (1-\lambda) \cdot |Z_p(m)|^2 \quad (3)$$

$$\gamma_p^{YZ}(m) = \lambda \cdot \gamma_{p-1}^{YZ}(m) + (1-\lambda) \cdot Y_p(m)[Z_p(m)]^* \quad (4)$$

where $|.|^2$ denotes the modulus squared and $(.)^*$ the conjugate of a complex number.

For each spectral component index m, the quantity $msc_p(m)$ exhibits a progressive variation, increasing between 0 and 1, as a function of the degree of similitude between the Fourier components $Z_p(m)$ and $Y_p(m)$. This quantity is updated with each new block of M samples.

Figure 8:
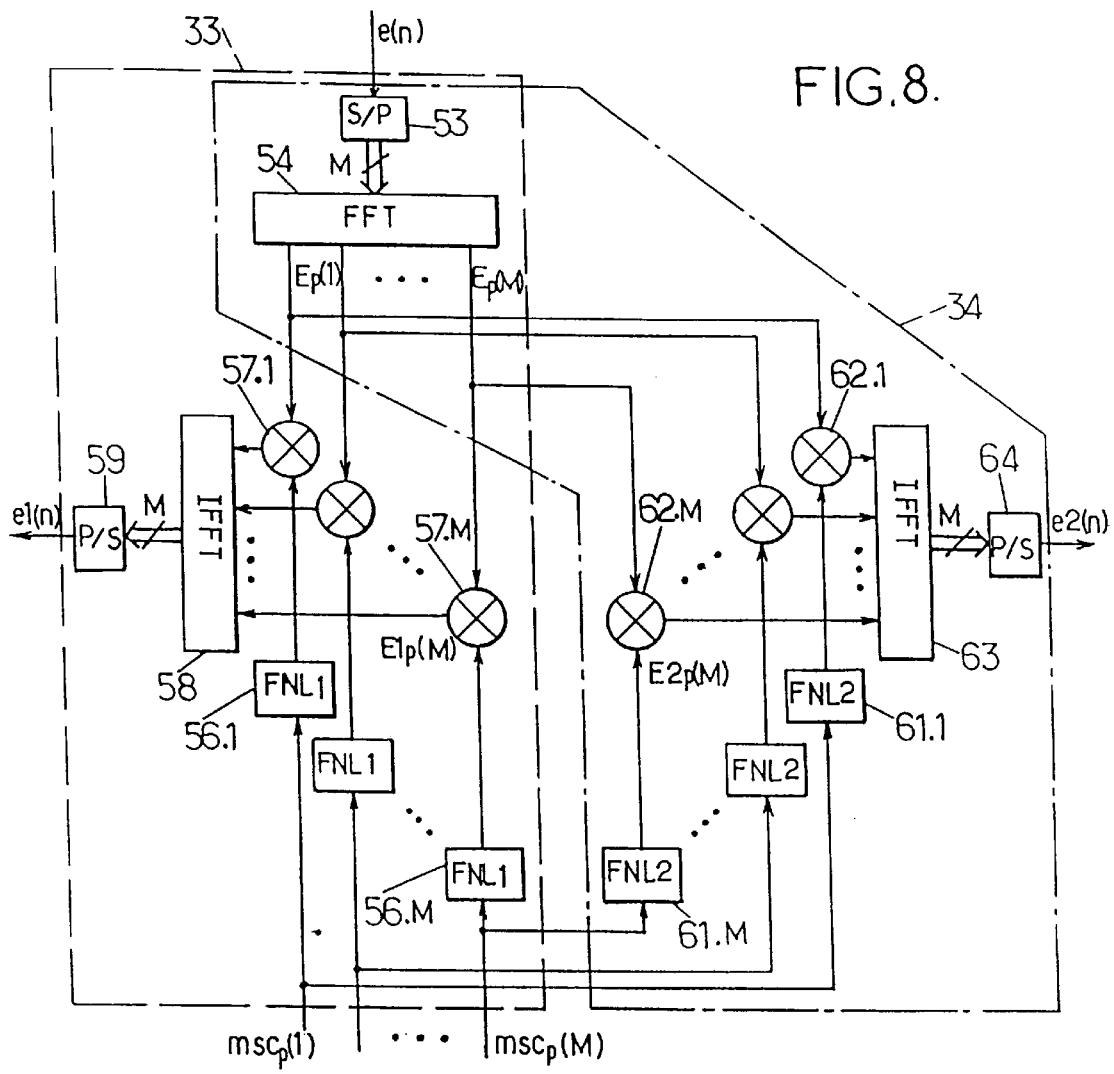
FIG. 8 is a schematic diagram of means for filtering the error signal in an echo canceller according to FIG. 6.

FIG. 8 shows a schematic diagram of the filter 33 and of the post-filter 34 which process the error signal e(n). These processing operations are here performed in the frequency domain, the filters 33 and 34 sharing the circuits which produce the Fourier components $E_p(m)$ of the error signal e(n). These circuits comprise a serial/parallel converter 53 producing blocks of M samples of the error signal e(n) in the same way as the converters 36, 37 of FIG. 7, and an FFT computation unit 54.

The filter 33 includes M circuits 56.m ($1 \leq m \leq M$) each calculating, for a respective value $msc_p(m)$ of the coherence function, the value taken by an increasing non-linear function FNL1. The non-linear function FNL1 has for example the form represented in FIG. 9, defined by three parameters a2, b2 and T1 such that $0 < a1 < b1 < 1$ and $0 < T1 < 1$: the function FNL1(x) is equal to T1 for $0 \leq x \leq a1$, it increases from T1 to 1 as x increases from a1 to b1, and is equal to 1 for $b1 \leq x \leq 1$. The parameter set T1, a1, b1 can be identical for each of the M Fourier components, or it can be different from one Fourier component to another. The values adopted for these parameters can be determined experimentally or by simulation as a function of the particular application and of the characteristics of the terminal equipped with the echo canceller. Each value FNL1($msc_p(m)$) produced by a circuit 56.m is supplied to a respective multiplier 57.m which also receives the corresponding Fourier component $E_p(m)$ of the error signal. The values $E1_p(m)$ delivered by the M multipliers 57.m are supplied to an IFFT computation unit 58 which obtains their inverse Fourier transform in the form of a block of M samples. A parallel/serial converter 59 forms the filtered error signal e1(n) on the basis of the blocks delivered by the unit 58.

This signal e1(n) is exploited by the adaptation control module 9 in the same way as the signal e(n) in the conventional case of FIG. 1. The adaptation of the filter 7 can be carried out according to any appropriate algorithm.

The post-filter 34 includes M circuits 61.m ($1 \leq m \leq M$) each calculating, for a respective value $msc_p(m)$ of the coherence function, the value taken by a decreasing non-linear function FNL2. The non-linear function FNL2 has for example the form represented in FIG. 10, defined by three parameters a2, b2 and T2 such that 0<a2<b2<1 and 0<T2<1: the function FNL2(x) is equal to 1 for $0 \leq x \leq a2$, it decreases from 1 to T2 as x increases from a2 to b2, and it is equal to T2 for $b2 \leq x \leq 1$. The parameter set T2, a2, b2 can be identical for each of the M Fourier components, or it can be different from one Fourier component to another. The values adopted for these parameters can be determined experimentally or by simulation. Each value FNL2($msc_p(m)$) produced by a circuit 61.m is supplied to a respective multiplier 62.m which also receives the corresponding Fourier component $E_p(m)$ of the error signal. The values $E2_p(m)$ delivered by the M multipliers 62.m are supplied to an IFFT computation unit 63 which obtains their inverse Fourier transform in the form of a block of M samples. A parallel/serial converter 64 forms the post-filtered error signal e2(n) on the basis of the blocks delivered by the unit 63.

When modules such as 32, 33, 34 (FIG. 6) are provided within the framework of an echo canceller operating by filtering in the frequency domain, it should be noted that the spectral resolution used for the coherence calculations can be equal to or less than the spectral resolution of the filter for modelling the echoes. In other words, with the notation of FIG. 2, it is possible to have M=2N or M<2N. On the other hand, the rate of updating of the coherence calculations, which corresponds to the rate of renewal of the blocks p of the M samples in FIG. 7, can be different from the rate of renewal of the blocks k of 2N samples in FIG. 2.

Furthermore, it is possible to subdivide the spectrum of the signals into Q sub-bands (Q>1) for the filterings of the error signal. The values of the coherence function for the frequency components pertaining to a given sub-band are then averaged, and it is the average value thus obtained which is fed to the non-linear functions FNL1 and FNL2. The value of a non-linear function for a given sub-band then serves to weight each of the Fourier components of the error signal which pertain to this sub-band.

Figure 2:
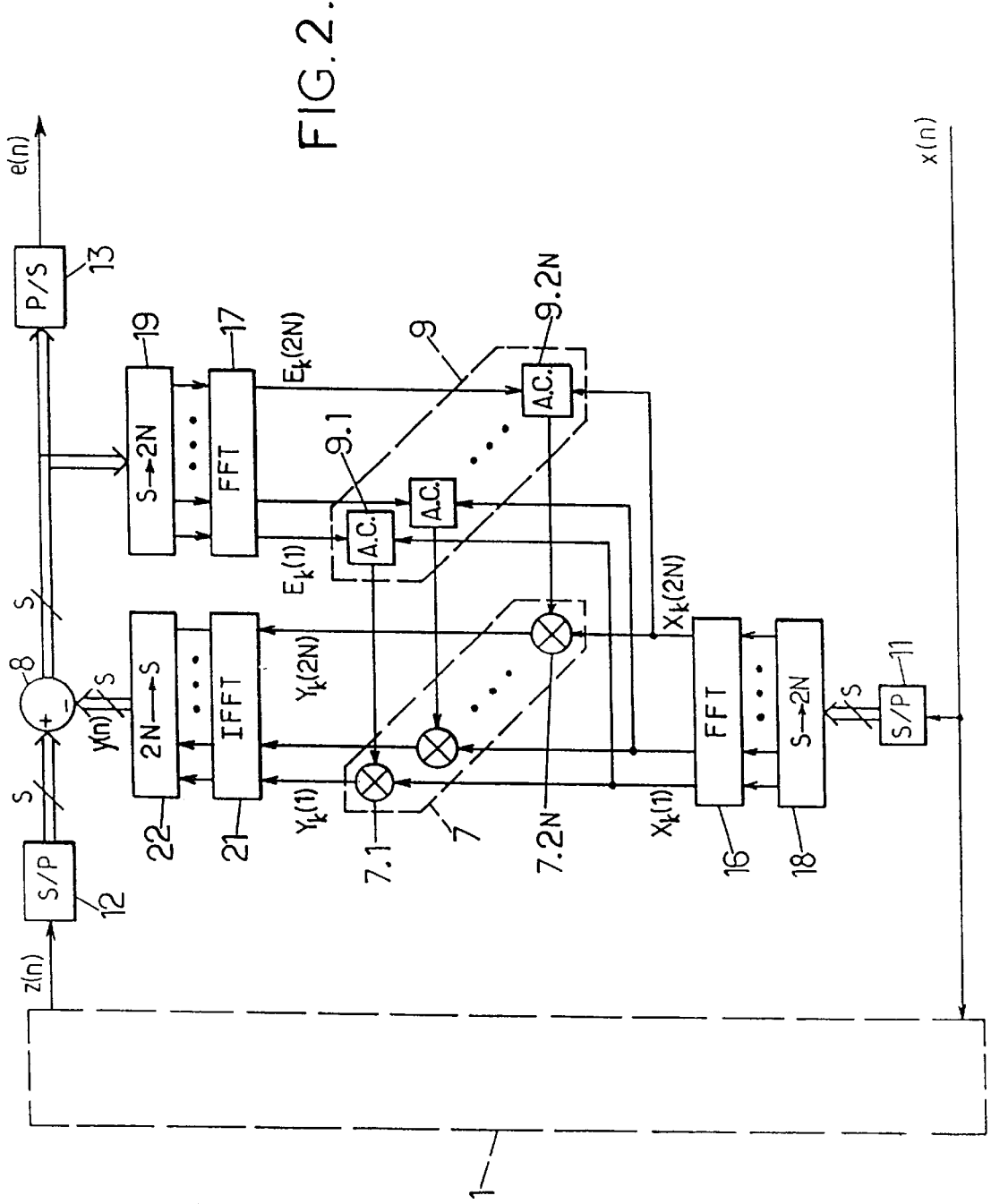
FIG. 2, previously commented upon, is a basic diagram of an adaptive echo canceller with filtering in the frequency domain.
Figure 11:
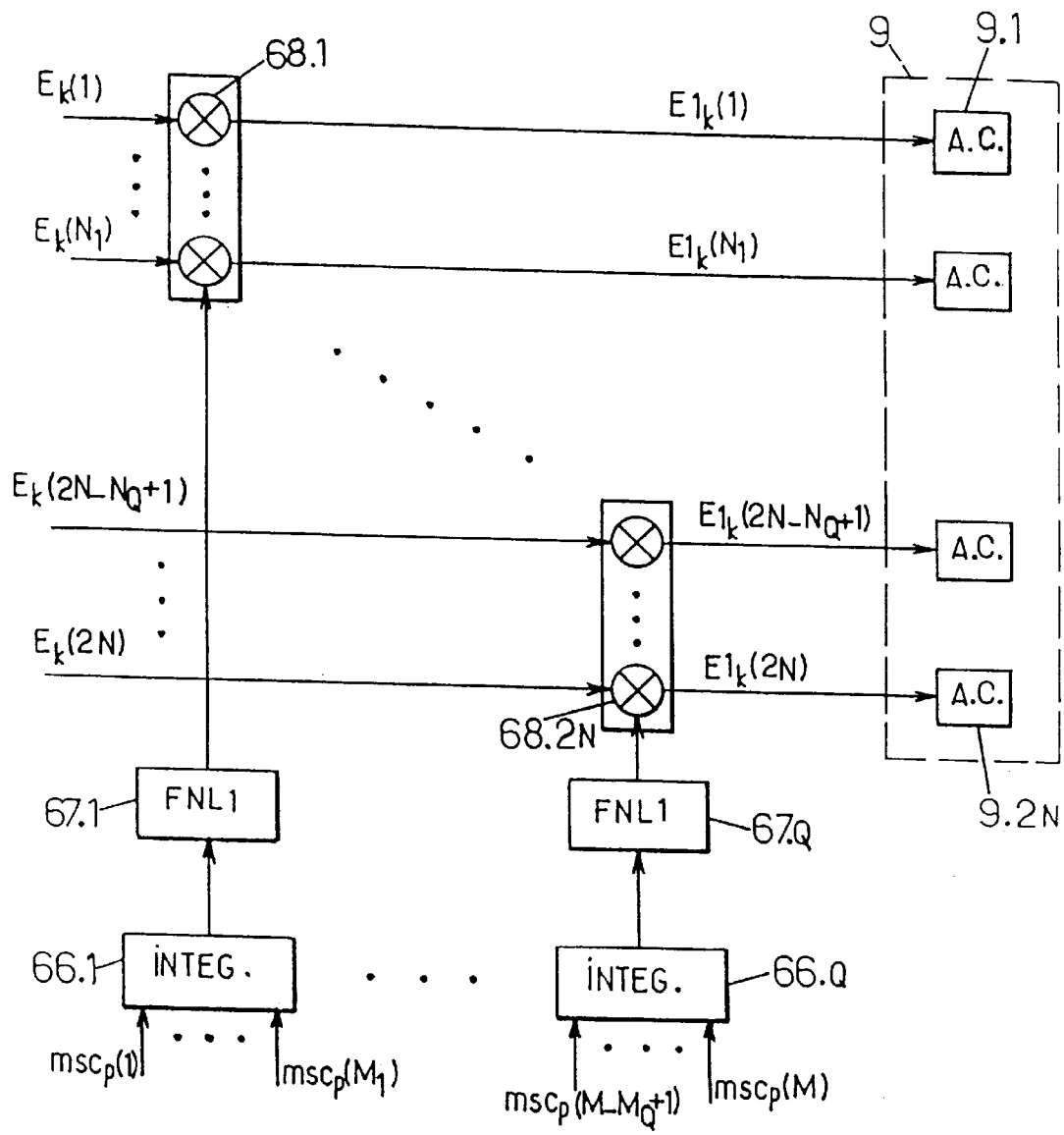
FIGS. 11 and 12 are diagrams of variant embodiments of the filtering means of FIG. 8.
Figure 12:
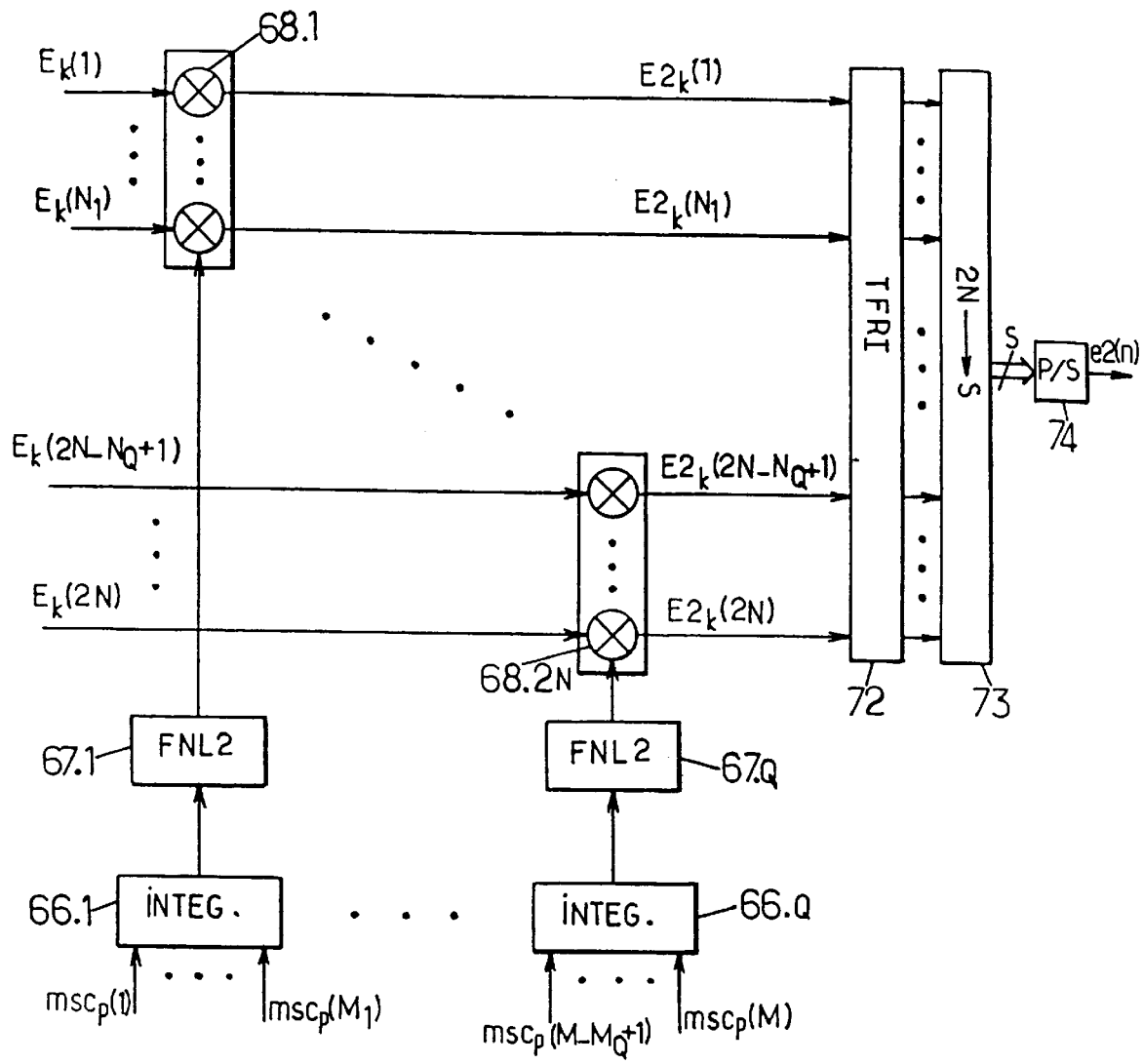

FIGS. 11 and 12 show such implementations for the filter and the post-filter of the error signal in the case of an echo canceller working in the frequency domain in accordance with FIG. 2, the values of the coherence function $msc_p(m)$ ($1 \leq m \leq M$ with $M \leq 2N$) being obtained by a module 32 complying with that represented in FIG. 7. It is assumed that the qth sub-band ($1 \leq q \leq Q$) covers $M_q$ Fourier components of the signals z(n) and y(n) for which the module 32 has calculated the values of the coherence function, and covers $N_q$ Fourier components of the error signal, calculated by the FFT unit 17. The subdivision into Q sub-bands can be uniform ($M_1=M_2=...=M_Q$ and $N_1=N_2=...=N_Q$) or non-uniform, for example according to a Bark scale such as used in the field of psycho-acoustics.

The filter of the error signal represented in FIG. 11 comprises Q integration circuits $66_q$ ($1 \leq q \leq Q$) which each calculate the arithmetic mean value of the $M_q$ values of the coherence function which relate to sub-band Q, and Q circuits 67.q which calculate, for the averages delivered by the integration circuits 66.q, the values taken by the increasing non-linear function FNL1 which can be identical or different for each sub-band. The filter further comprises 2N multipliers 68.f ($1 \leq f \leq 2N$) each receiving a respective Fourier component $E_k(f)$ of the error signal as well as the value delivered by the circuit 67.q, where q denotes the sub-band pertaining to the Fourier component f of the error signal. In the case of FIG. 11, the filtered error signal e1(n) is not produced explicitly in the time domain, but in the form of its 2N Fourier components $E1_k(f)$ which are the weighted Fourier components of the error signal, respectively delivered by the multipliers 68.f. These components $E1_k(f)$ are respectively supplied as filtered error signal to the 2N adaptation control modules 9.f which are of the same type as those shown in FIG. 2.

The Q integration circuits 66.q also form part of the post-filter of the error signal represented in FIG. 12, which also comprises Q circuits 69.q which calculate, for the averages delivered by the integration circuits 66.q, the values taken by the decreasing non-linear function FNL2 which can be identical or different for each sub-band. The post-filter further comprises 2N multipliers 71.f ($1 \leq f \leq 2N$) each receiving a respective Fourier component $E_k(f)$ of the error signal as well as the value delivered by the circuit 69.q, where q denotes the sub-band pertaining to the Fourier component f of the error signal. The weighted Fourier components $E2_k(f)$ respectively delivered by the multipliers 68.f are supplied to an IFFT computation unit 72 producing blocks of 2N samples. From these blocks, a unit 73 similar to the unit 22 of FIG. 2 constructs segment by segment the post-filtered error signal e2(n) which a parallel/serial converter 74 casts back into sequential form.

As has been indicated earlier, an advantageous alternative of the invention consists in replacing the function of coherence between the components $Z_p(m)$ and $Y_p(m)$ by a decreasing function of the angle $\omega_p(m)$ formed, in the complex plane, between the complex numbers $Z_p(m)$ and $Y_p(m)$ which, in the case illustrated by FIG. 7, are produced by the FFT units 38 and 39. In other words, the angle $\omega_p(m)$ is the argument of the complex number $Z_p(m)/Y_p(m)$. If a and a' denote the real parts of $Z_p(m)$ and $Y_p(m)$ respectively, and b and b' denote their imaginary parts, then:

$$\cos\varphi_p(m) = \frac{aa' + bb'}{\sqrt{(a^2+b^2)(a'^2+b'^2)}}$$

This cosine of the angle $\omega_p(m)$, bounded between $-\pi/2$ and $+\pi/2$ (since a phase shift of $\pi$ implies a presence of interferences, given that compensation of the acoustic channel has already been carried out in the signal y(n) by the filter 7), is another normalized measurement of the degree of similitude between the components $Z_p(m)$ and $Y_p(m)$, which has the advantage of being easily calculated block by block without having to store amounts for carrying out averagings (according to relations (2) to (4)). In practice, it will be possible to calculate the square $\alpha_p(m)$ of $\cos\omega_p(m)$ so as to avoid the square root calculation which it will be possible to take into account in the definition of the non-linear functions FNL1 and FNL2.

In this alternative, the units 41.m of FIG. 7 are devised so as to deliver $\alpha_p(m)=0$ if aa'+bb'$\leq 0$, and $\alpha_p(m)=(aa+bb)^2/$

[(a²+b²) (a'²+b'²)] otherwise. These quantities $\alpha_p(m)$ can be processed in a manner similar to the $msc_p(m)$ by filters and post-filters such as those shown diagrammatically in FIGS. 9 to 12.

Figure 3:
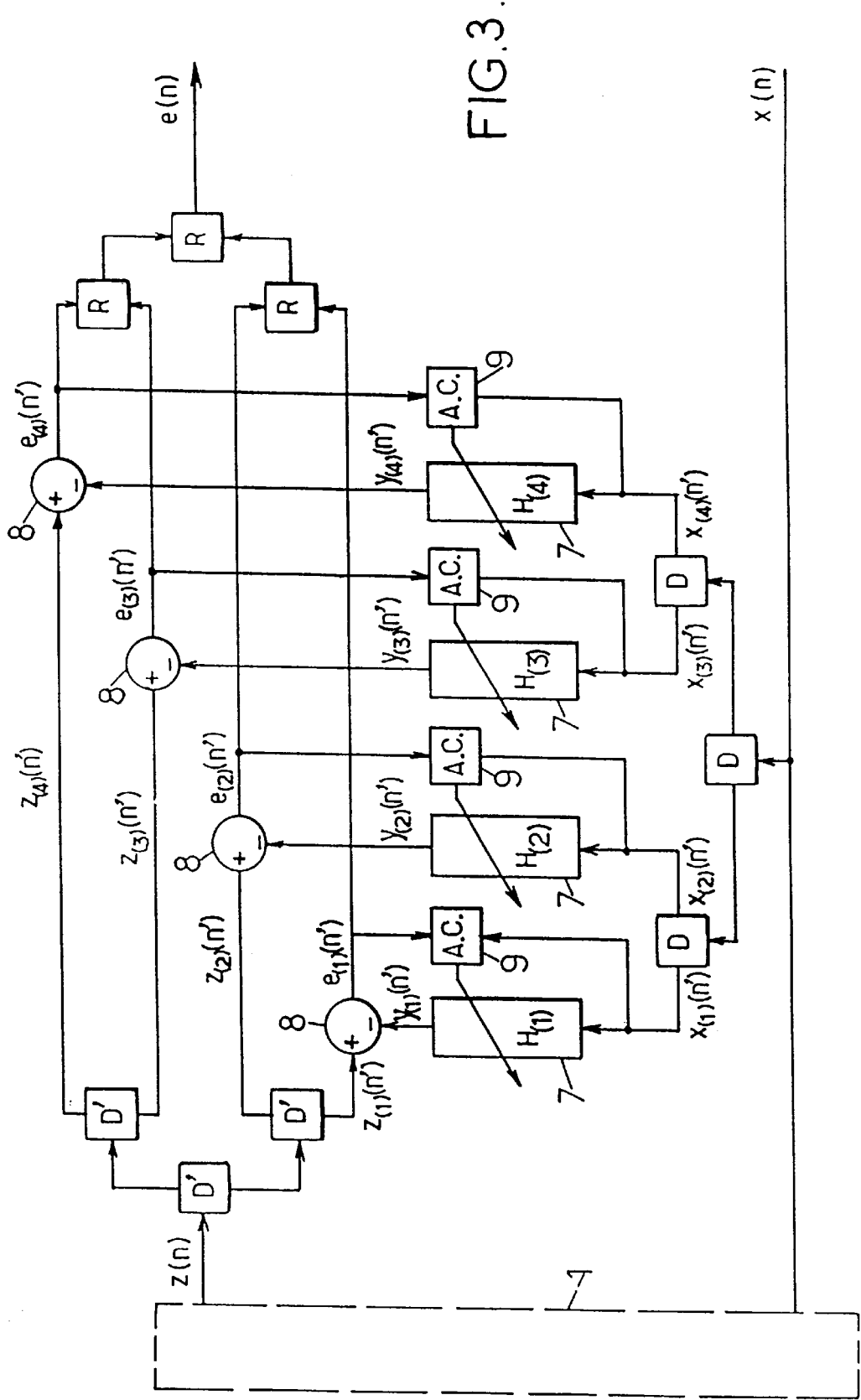
FIG. 3, previously commented upon, is a basic diagram of an adaptive echo canceller with sub-band filtering.
Figure 4:
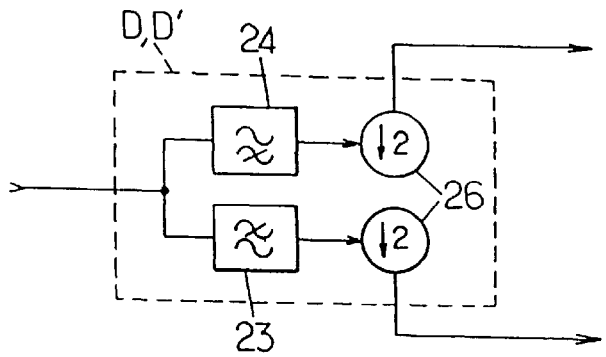
FIGS. 4 and 5, previously commented upon, are schematic diagrams of decomposition and recombination means of the echo canceller of FIG. 3.
Figure 5:
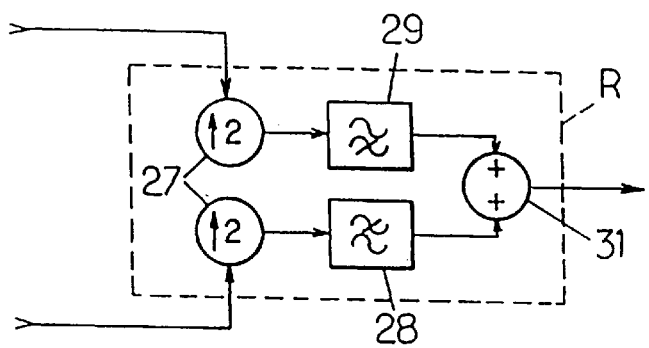

In the case of a sub-band echo canceller, the spectral resolution required according to the invention does not result from a Fourier transform, but from a decomposition into M sub-bands. The M quantities serving to quantify in a progressive manner the similitude between the signals z(n) and y(n) can then be the values taken by a function of normalized intercorrelation between the spectral components $z_{(i)}(n')$ and $y_{(i)}(n')$ (FIG. 3), such as:

$$r_{(i)} = \frac{E[y_{(i)}(n') \cdot z_{(i)}(n')]^2}{E[y_{(i)}^2(n')] \cdot E[z_{(i)}^2(n')]} \quad (5)$$

where E[.] denotes the mathematical expectation. The mathematical expectations of relation (5) can be calculated by exact averaging over an analysis window, in which case the $r_{(i)}$ are updated with each new window, or by means of an forgetting factor in a manner similar to relations (2) to (4), in which case the $r_{(i)}$ can be updated with each sub-sampling time. The value of $r_{(i)}$ increases progressively from 0 to 1 according to the degree of similitude between the signals $z_{(i)}(n')$ and $Y_{(i)}(n')$.

Figure 13:
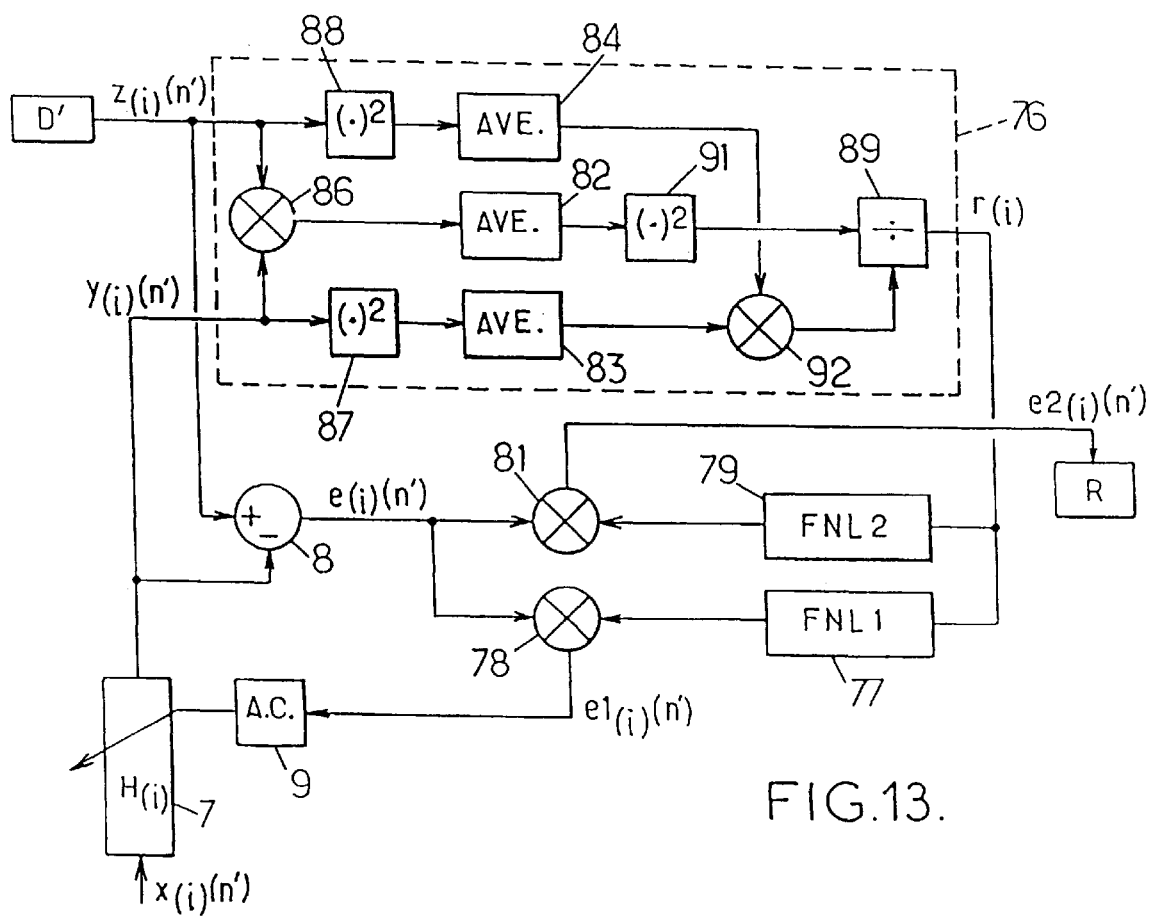
FIG. 13 is a schematic diagram of means allowing the implementation of the present invention in an adaptive echo canceller with sub-band filtering.
Figure 9:
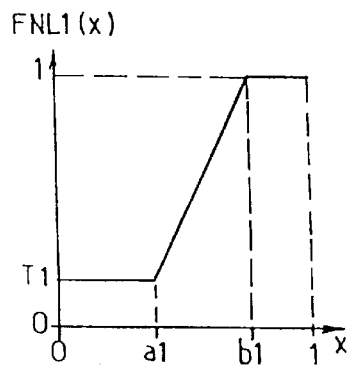
FIGS. 9 and 10 are graphs illustrating possible forms of non-linear functions which can be used to implement the invention.
Figure 10:
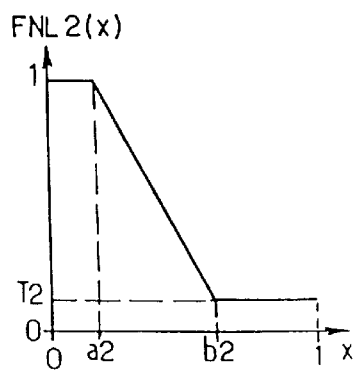

Each processing path of a sub-band i can then be supplemented with the means represented in FIG. 13, which comprise:

- a unit 76 calculating the value $r_{(i)}$ of the normalized intercorrelation function for the components $Z_{(i)}(n')$ and $y_{(i)}(n')$ supplied respectively by the decomposition means D' and by the filter 7 relating to sub-band i;
- a circuit 77 calculating for the value of $r_{(i)}$ the value taken by an increasing non-linear function FNL1 which may be of the same type as that represented graphically in FIG. 9 and which may be different from one sub-band to another;
- a multiplier 78 which weights the spectral component $e_{(i)}(n')$ of the error signal, delivered by the subtracter 8, by the value supplied by the circuit 77, and which supplies the weighted component $e1_{(i)}(n')$ to the adaptation control module 9 relating to sub-band i;
- a circuit 79 calculating for the value of $r_{(i)}$ the value taken by a decreasing non-linear function FNL2 which may be of the same type as that represented graphically in FIG. 10 and which may be different from one sub-band to another; and
- a multiplier 81 which weights the spectral component $e_{(i)}(n')$ of the error signal, delivered by the subtracter 8, by the value supplied by the circuit 79, and which supplies the weighted component $e2_{(i)}(n')$ to the appropriate module R of the recombination means.

The M circuits 77 and the M multipliers 78 relating to the various sub-bands constitute, in a manner similar to the filter 33 of FIG. 6, the filter which carries out the spectral shaping of the error signal as a function of the M quantities $r_{(i)}$ for the adaptation of the filtering of the reception signal x(n).

The M circuits 79, the M multipliers 81 and the recombination modules R constitute, in a manner similar to the post-filter 34 of FIG. 6, the post-filter which carries out the spectral shaping of the error signal as a function of the M quantities $r_{(i)}$ for the production of the output signal from the echo canceller.

For the calculation of the mathematical expectations of relation (5), the unit 76 can comprise three averaging circuits 82, 83, 84 respectively receiving the successive values of $y_{(i)}(n') \cdot z_{(i)}(n')$, of $y^2_{(i)}(n')$ and of $z^2_{(i)}(n')$ from a multiplier 86 and from two squaring circuits 87, 88. The quotient of relation (5) is calculated by a divider 89 receiving the numerator from a squaring circuit 91 and the denominator from a multiplier 92.

In the above description and the appended drawings, embodiments of the invention have been presented on the basis of hardware layouts of modules, units or individualized circuits, so as to make the explanation as clear as possible. Those skilled in the art will appreciate that the invention can also be implemented differently, in particular by programming an appropriate digital signal processor as is usual in the art of echo cancellers.

We claim:

1. An echo cancellation method, wherein a reception signal is input to an echo generator system, an observation signal is gathered from said system, the reception signal is filtered so as to produce at least one echo prediction signal for predicting an echo of the reception signal in the observation signal, and an echo prediction signal is subtracted from the observation signal so as to produce an error signal, the method comprising the steps of:

decomposing the observation signal into M spectral components relating to different frequencies of the spectrum, M denoting an integer greater than 1;

obtaining M corresponding spectral components of is an echo prediction signal;

calculating M quantities from the spectral components of the observation signal and of the echo prediction signal, each of said M quantities having a value with progressive variation representative of a degree of similitude between, respectively, one of the M spectral components of the observation signal and the corresponding spectral component of the echo prediction signal; and carrying out at least one spectral shaping of an error signal as a function of said M calculated quantities.

2. A method according to claim 1, wherein the filtering of the reception signal is adapted as a function of the reception signal and of an error signal, and wherein a spectral shaping of the error signal is carried out, producing a filtered error signal as a function of which the adaptation of the filtering of the reception signal is performed.

3. A method according to claim 1, wherein a spectral shaping of an error signal is carried out, producing a post-filtered error signal transmitted towards a communication channel.

4. A method according to claim 1, wherein the M spectral components of the observation signal and of the echo prediction signal are Fourier components of said signals, and wherein the quantity representative of the degree of similitude between two corresponding Fourier components of the observation signal and of the echo prediction signal is a value of a function of coherence between said two Fourier components, or a value of a decreasing function of the absolute value of the angle formed, in the complex plane, between said two Fourier components.

5. A method according to claim 4, further comprising the step of obtaining M Fourier components of the error signal, which correspond respectively to the M Fourier components of the observation signal and of the echo prediction signal, wherein each spectral shaping of the error signal includes a weighting of each of the M Fourier components thereof by an amount having a non-linear dependence on the value of that of the M quantities which represents the degree of similitude between the corresponding Fourier components of the observation signal and of the error prediction signal.

6. A method according to claim 5, wherein a spectral shaping of an error signal is carried out, producing a post-filtered error signal transmitted towards a communication channel, and wherein, for the production of the post-filtered error signal, said non-linear dependence is defined by a decreasing non-linear function, the post-filtered error signal being obtained by applying an inverse Fourier transform to the weighted Fourier components of the error signal.

7. A method according to claim 5, wherein the filtering of the reception signal is adapted as a function of the reception signal and of an error signal, wherein a spectral shaping of the error signal is carried out, producing a filtered error signal as a function of which the adaptation of the filtering of the reception signal is performed, and wherein, for the production of the filtered error signal, said non-linear dependence is defined by an increasing non-linear function.

8. A method according to claim 7, wherein the filtered error signal is produced by applying an inverse Fourier transform to the weighted Fourier components of the error signal.

9. A method according to claim 7, further comprising the step of performing a Fourier transform of the reception signal so as to obtain a number 2N, at least equal to M, of Fourier components thereof, wherein an echo prediction signal is produced in the form of 2N Fourier components obtained by weighting the Fourier components of the reception signal by respective adaptive complex coefficients, each of said coefficients being associated with a weighted Fourier component of the error signal which is used, with the corresponding Fourier component of the reception signal, to adapt the value of said coefficient.

10. A method according to claim 4, further comprising the steps of
obtaining a number 2N at least equal to M of Fourier components of the error signal;
distributing the Fourier components of the signals into several predetermined sub-bands; and
calculating, for each sub-band, a mean value of those of the M quantities which represent degrees of similitude between the Fourier components relating to said sub-band of the observation signal and of the echo prediction signal,
wherein each spectral shaping of the error signal includes a weighting of each of the 2N Fourier components thereof by an amount having a non-linear dependence on the mean value calculated for the sub-band pertaining to said Fourier component of the error signal.

11. A method according to claim 10, wherein the filtering of the reception signal is adapted as a function of the reception signal and of an error signal, wherein a spectral shaping of the error signal is carried out, producing a filtered error signal as a function of which the adaptation of the filtering of the reception signal is performed, and wherein, for the production of the filtered error signal, said non-linear dependence is defined by an increasing non-linear function.

12. A method according to claim 11, wherein the filtered error signal is produced by applying an inverse Fourier transform to the weighted Fourier components of the error signal.

13. A method according to claim 11, further comprising the step of performing a Fourier transform of the reception signal so as to obtain a number 2N, at least equal to M, of Fourier components thereof, wherein an echo prediction signal is produced in the form of 2N Fourier components obtained by weighting the Fourier components of the reception signal by respective adaptive complex coefficients, each of said coefficients being associated with a weighted Fourier component of the error signal which is used, with the corresponding Fourier component of the reception signal, to adapt the value of said coefficient.

14. A method according to claim 1, wherein the M spectral components of the observation signal are obtained by a sub-band decomposition of the observation signal, wherein a corresponding sub-band decomposition is performed on the reception signal so as to produce M corresponding spectral components of the reception signal, wherein the echo prediction signal is produced in the form of M spectral components thereof respectively delivered by M adaptive filters to which the M spectral components of the reception signal are respectively applied, wherein the error signal is produced in the form of M corresponding spectral components each of which is obtained by subtracting a spectral component of the echo prediction signal from a corresponding spectral component of the observation signal, and wherein the quantity representative of the degree of similitude between two corresponding spectral components of the observation signal and of the echo prediction signal is a value of a function of normalized intercorrelation between said two spectral components.

15. A method according to claim 14, wherein each spectral shaping of the error signal includes a weighting of each of the M spectral components thereof by an amount depending in a non-linear manner on the value of the intercorrelation function between the corresponding spectral components of the observation signal and of the echo prediction signal.

16. A method according to claim 15, wherein the filtering of the reception signal is adapted as a function of the reception signal and of an error signal, wherein a spectral shaping of the error signal is carried out, producing a filtered error signal as a function of which the adaptation of the filtering of the reception signal is performed, wherein, for the production of the filtered error signal, the amount for weighting each spectral component of the error signal is an increasing non-linear function of the value of the intercorrelation function, and wherein each filter to which a spectral component of the reception signal is applied is adapted as a function of said component and of the corresponding weighted spectral component of the error signal.

17. A method according to claim 15, wherein a spectral shaping of an error signal is carried out, producing a post-filtered error signal transmitted towards a communication channel, wherein, for the production of the post-filtered error signal, the amount for weighting each spectral component of the error signal is a decreasing non-linear function of the value of the intercorrelation function, and wherein the post-filtered error signal is obtained by a recombination, dual of the sub-band decomposition, of the weighted spectral components of the error signal.

18. Adaptive echo canceller, wherein a reception signal is input to an echo generator system and an observation signal is obtained from said system, comprising:
filtering means for producing, by filtering the reception signal, at least one echo prediction signal for predicting an echo of the reception signal in the observation signal;
subtracter means for producing an error signal by subtracting an echo prediction signal from the observation signal;

means for decomposing the observation signal into M spectral components relating to different frequencies of the spectrum, M denoting an integer greater than 1;

means for calculating M quantities from the M spectral components of the observation signal and M corresponding spectral components of an echo prediction signal, each of said M quantities having a value with progressive variation representative of a degree of similitude between, respectively, one of the M spectral components of the observation signal and the corresponding spectral component of the echo prediction signal; and means for spectral shaping of the error signal as a function of said M calculated quantities.

19. Adaptive echo canceller according to claim 18, further comprising adaptation means for dynamically adjusting filtering parameters used by the filtering means, as a function of the reception signal and of the error signal, wherein the spectral shaping means comprise a filter to which the error signal is fed and from which the output signal is supplied to the adaptation means.

20. Adaptive echo canceller according to claim 18, wherein the spectral shaping means comprise a post-filter to which the error signal is fed and the output from which delivers the output signal from the echo canceller.

21. Adaptive echo canceller according to claim 18, wherein the means for filtering the reception signal are arranged to perform a filtering in the frequency domain.

22. Adaptive echo canceller according to claim 18, wherein the means for filtering the reception signal are arranged to perform a filtering in M sub-bands with which the M spectral components of the signals are respectively associated.

* * * * *